US012567392B2

(12) United States Patent
M

(10) Patent No.: US 12,567,392 B2
(45) Date of Patent: Mar. 3, 2026

(54) METHOD FOR A TELEVISION TO ASSIST A VIEWER IN IMPROVING WATCHING EXPERIENCE IN A ROOM, AND A TELEVISION IMPLEMENTING THE SAME

(71) Applicant: Top Victory Investments Limited, Hong Kong (HK)

(72) Inventor: Sunil M, Karnataka (IN)

(73) Assignee: TOP VICTORY INVESTMENTS LIMITED, Hong Kong (HK)

( * ) Notice: Subject to any disclaimer, the term of this patent is extended or adjusted under 35 U.S.C. 154(b) by 392 days.

(21) Appl. No.: 18/329,379

(22) Filed: Jun. 5, 2023

(65) Prior Publication Data

US 2024/0395226 A1     Nov. 28, 2024

(30) Foreign Application Priority Data

May 24, 2023    (EP) ..................................... 23175068

(51) Int. Cl.
G06V 10/762        (2022.01)
G06T 5/70        (2024.01)
(Continued)

(52) U.S. Cl.
CPC .............. G09G 5/377 (2013.01); G06T 5/70 (2024.01); G06T 7/13 (2017.01); G06V 10/60 (2022.01);
(Continued)

(58) Field of Classification Search
None
See application file for complete search history.

(56) References Cited

U.S. PATENT DOCUMENTS 5,854,661 A  *  12/1998  Kochanski ............... G09G 5/00
348/602
2010/0141578 A1    6/2010  Horiuchi et al.
(Continued)

FOREIGN PATENT DOCUMENTS

WO      WO-2022178934 A1 *   9/2022   ........... G06F 18/256

OTHER PUBLICATIONS

Savakis (A. E. Savakis, "Adaptive document image thresholding using foreground and background clustering," Proceedings 1998 International Conference on Image Processing. ICIP98 (Cat. No. 98CB36269), Chicago, IL, USA, 1998, pp. 785-789 vol. 3, doi: 10.1109/ICIP.1998.999064.) (Year: 1998).*

(Continued)

*Primary Examiner* — Devona E Faulk
*Assistant Examiner* — Dan F Kalhori
(74) *Attorney, Agent, or Firm* — HSML P.C.

(57)              ABSTRACT

A method is provided for a television to assist a viewer in improving watching experience in a room in which the television is placed. The television includes a camera unit to capture a room image that contains an indoor environment of the room, and a processing unit. The processing unit finds a visually-interfering condition in the room based on the room image, where the visually-interfering condition is related to a visual interference that would interfere with television-watching. The processing unit then causes a display unit to display the room image, with an overlay that visually signifies the visually-interfering condition covering the room image.

20 Claims, 9 Drawing Sheets

9

(51) Int. Cl.
    G06T 7/13        (2017.01)
    G06V 10/60     (2022.01)
    G06V 20/00     (2022.01)
    G09G 5/377    (2006.01)

(52) U.S. Cl.
    CPC ............ G06V 10/762 (2022.01); G06V 20/36
           (2022.01); *G06V 2201/07* (2022.01)

(56) References Cited

U.S. PATENT DOCUMENTS

| | | |
|---|---|---|
| 2013/0050458 A1 | 2/2013 | Kim et al. |
| 2015/0161469 A1 | 6/2015 | Bocharov et al. |
| 2019/0378327 A1* | 12/2019 | Kunkel ................... G06F 3/147 |

OTHER PUBLICATIONS

Tang et al. (J. K. T. Tang, W.-M. Lau, K.-K. Chan and K.-H. To, "AR interior designer: Automatic furniture arrangement using spatial and functional relationships," 2014 International Conference on Virtual Systems & Multimedia (VSMM), Hong Kong, China, 2014, pp. 345-352 (Year: 2014).*
Search Report issued to European counterpart application No. 23175068.8 by the EPO on Oct. 13, 2023, 8 pages.

* cited by examiner

METHOD FOR A TELEVISION TO ASSIST A VIEWER IN IMPROVING WATCHING EXPERIENCE IN A ROOM, AND A TELEVISION IMPLEMENTING THE SAME

CROSS-REFERENCE TO RELATED APPLICATION

This application claims priority to European Patent Application No. EP23175068.8, filed on May 24, 2023.

FIELD

The disclosure relates to a television, and more particularly to a television that is adapted to assist a viewer in improving watching experience in a room.

BACKGROUND

When watching television in a room, some real world problems may adversely affect the watching experience. For example, when something in the room is much brighter than other parts of the room, like a lamp that is turned on or sunlight shining in through a window or from a partly open curtain, there may be glare on the screen of the television. The viewer would then need to find out the origin of the glare in order to eliminate the light interference, which may be a time-consuming trial-and-error process. In another example, when the television is set at an inappropriate tilt angle (e.g., facing too upward or downward), viewers may feel uncomfortable and be unable to perceive good visual presentation when watching television while not realizing what the problem is.

SUMMARY

Therefore, an object of the disclosure is to provide a method enabling a television to find one or more real world problems that may adversely affect the television watching experience and notify the viewers of the problems found, so the viewers can responsively make corresponding adjustments to improve the watching experience.

According to the disclosure, the method is adapted for a television to assist a viewer in improving watching experience in a room in which the television is placed. The method includes steps of: by a camera unit that is mounted to the television, capturing a room image that contains an indoor environment of the room; by a processing unit of the television, finding a visually-interfering condition in the room based on the room image, wherein the visually-interfering condition is related to a visual interference that would interfere with television-watching; and by the processing unit, causing a display unit of the television to display the room image, with an overlay covering the room image, wherein the overlay visually signifies the visually-interfering condition.

Another object of the disclosure is to provide a television that implements the method of this disclosure.

According to the disclosure, the television is adapted to assist a viewer in improving watching experience in a room in which the television is placed, and includes a housing, a camera unit mounted to the housing, a processing unit coupled to the camera unit, and a display unit coupled to the processing unit. The camera unit, the processing unit and the display unit are configured to cooperatively perform the method of this disclosure.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
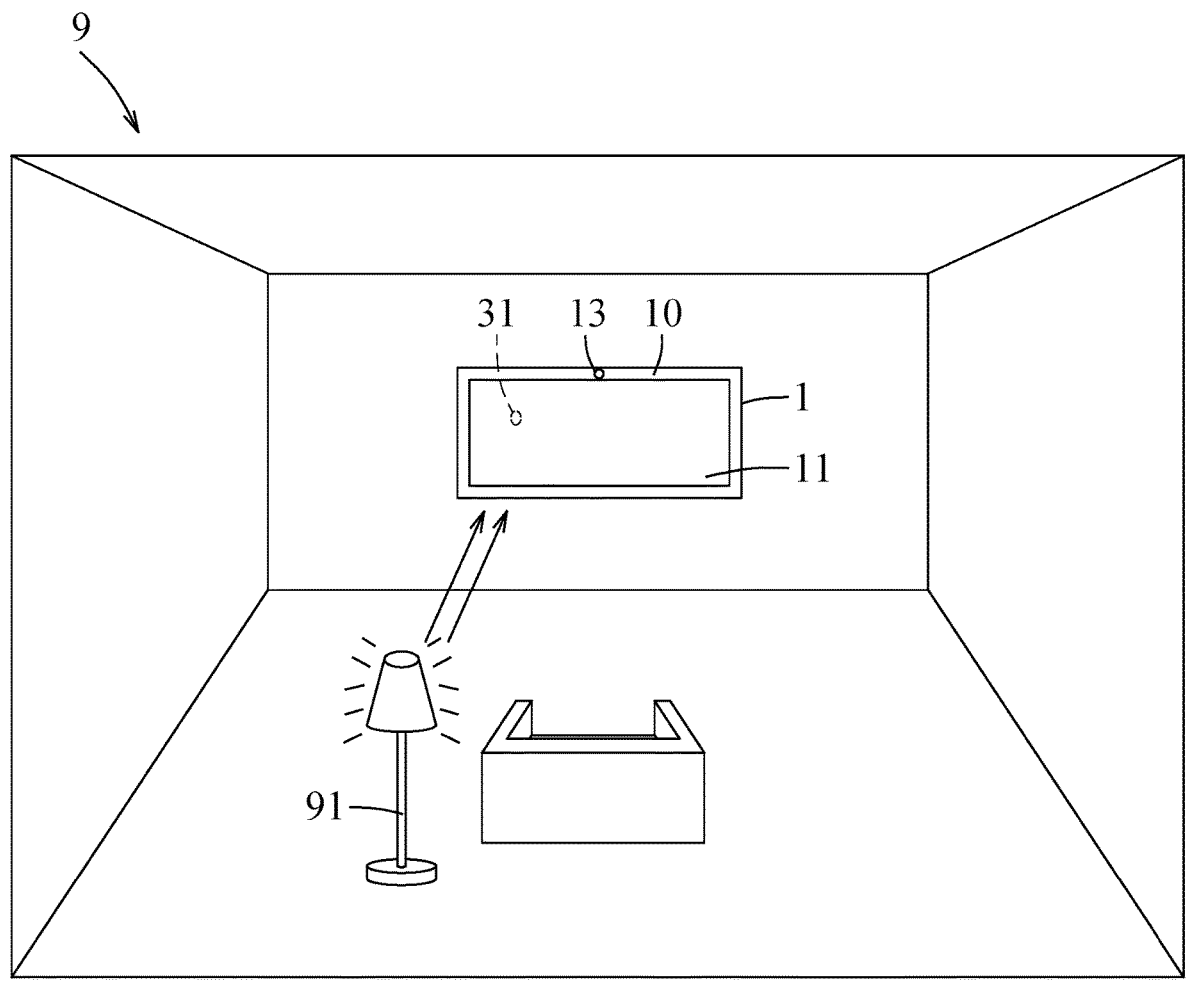
FIG. 1 is a perspective view illustrating a room provided with a television according to some embodiments.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
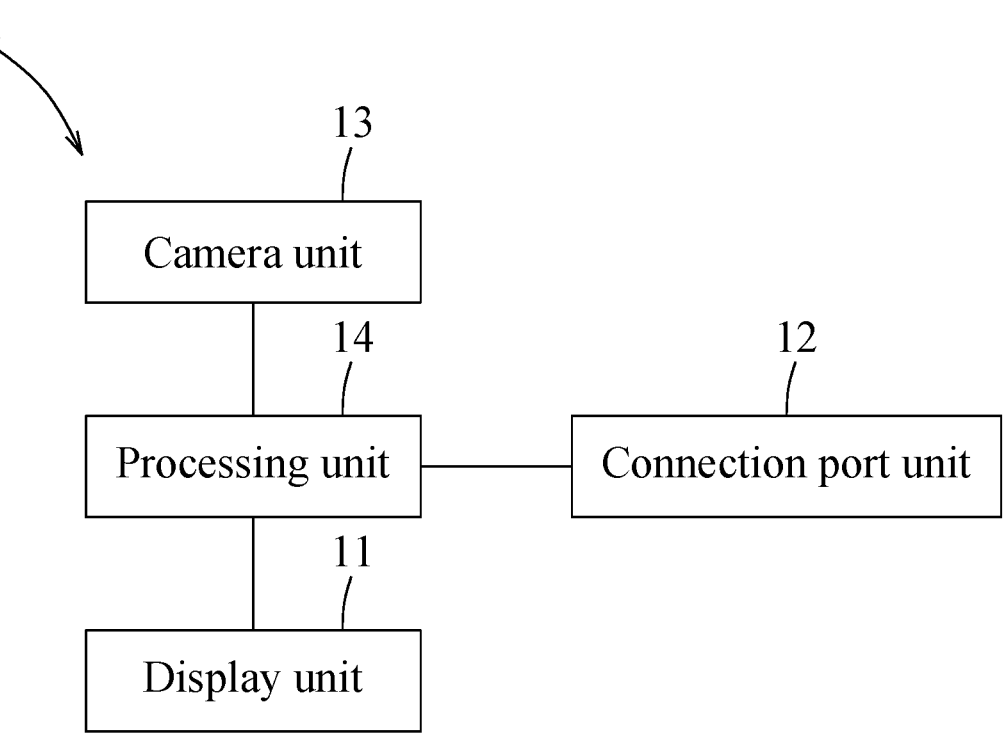
FIG. 2 is a block diagram illustrating a configuration of the television according to some embodiments.

Referring to FIGS. 1 and 2, an embodiment of a television 1 according to this disclosure is placed in a room 9, and includes a housing 10, a display unit 11, a connection port unit 12, a camera unit 13 and a processing unit 14.

The display unit 11 is mounted to the housing 10 and electrically coupled to the processing unit 14, and may be, for example, a liquid crystal display (LCD), an organic light-emitting diode (OLED) display, a light-emitting diode (LED) display, or a display of other suitable types.

The connection port unit 12 is mounted to the housing 10 and electrically coupled to the processing unit 14, and includes multiple input/output ports for receiving and/or transmitting audio and video signals. The input/output ports may include, for example, high definition multimedia interface (HDMI) ports, display ports, universal serial bus (USB) ports, ports of other suitable types, or any combination thereof.

The camera unit 13 is mounted to the housing 10 and electrically coupled to the processing unit 14, and is configured to capture an image (either a still image or a motion image) of an indoor environment of the room 9, which is referred to as a room image hereinafter. In the illustrative embodiment, the camera unit 13 is mounted to a central part of a top portion of the housing 10, so the room image can equally show a left-side view and a right-side view of the room 9 from the perspective of the television 1, but this disclosure is not limited in this respect.

The processing unit 14 is accommodated in the housing 10, and may include, for example, a processor, a graphics engine, chips of other types as needed, or any combination thereof, and is configured to control operation of the display unit 11 and the camera unit 13.

In FIG. 1, the room 9 is provided with a lamp 91 that is turned on, and the light emitted by the lamp 91 is reflected by a screen of the display unit 11, which may cause a viewer (who may sit on a sofa shown in FIG. 1, not shown) to see a glare or a bright spot 31 on the screen. The glare or the bright spot 31 may adversely affect the viewer's watching experience. In the illustrative embodiment, the lamp 91 is a floor lamp. In some embodiments, the lamp 91 may be a table lamp placed on a table (not shown) in the room 9 or a lamp of other types. However, this disclosure is not limited in this respect.

Figure 3:
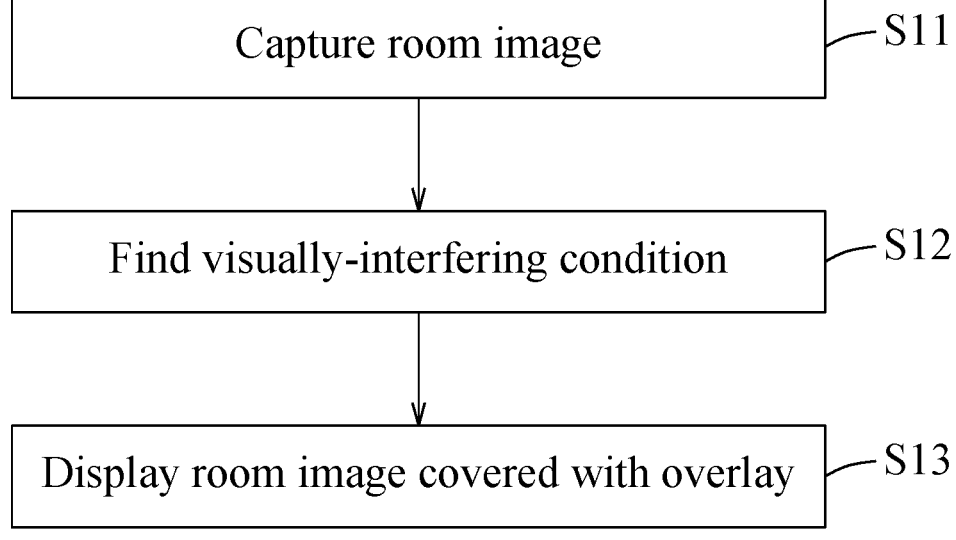
FIG. 3 is a flow chart illustrating a method adapted for the television to assist a viewer in improving watching experience in a room according to some embodiments.

Further referring to FIG. 3, an embodiment of a method for the television 1 to assist the viewer in improving the watching experience is provided to include steps S11 to S13.

Figure 4:
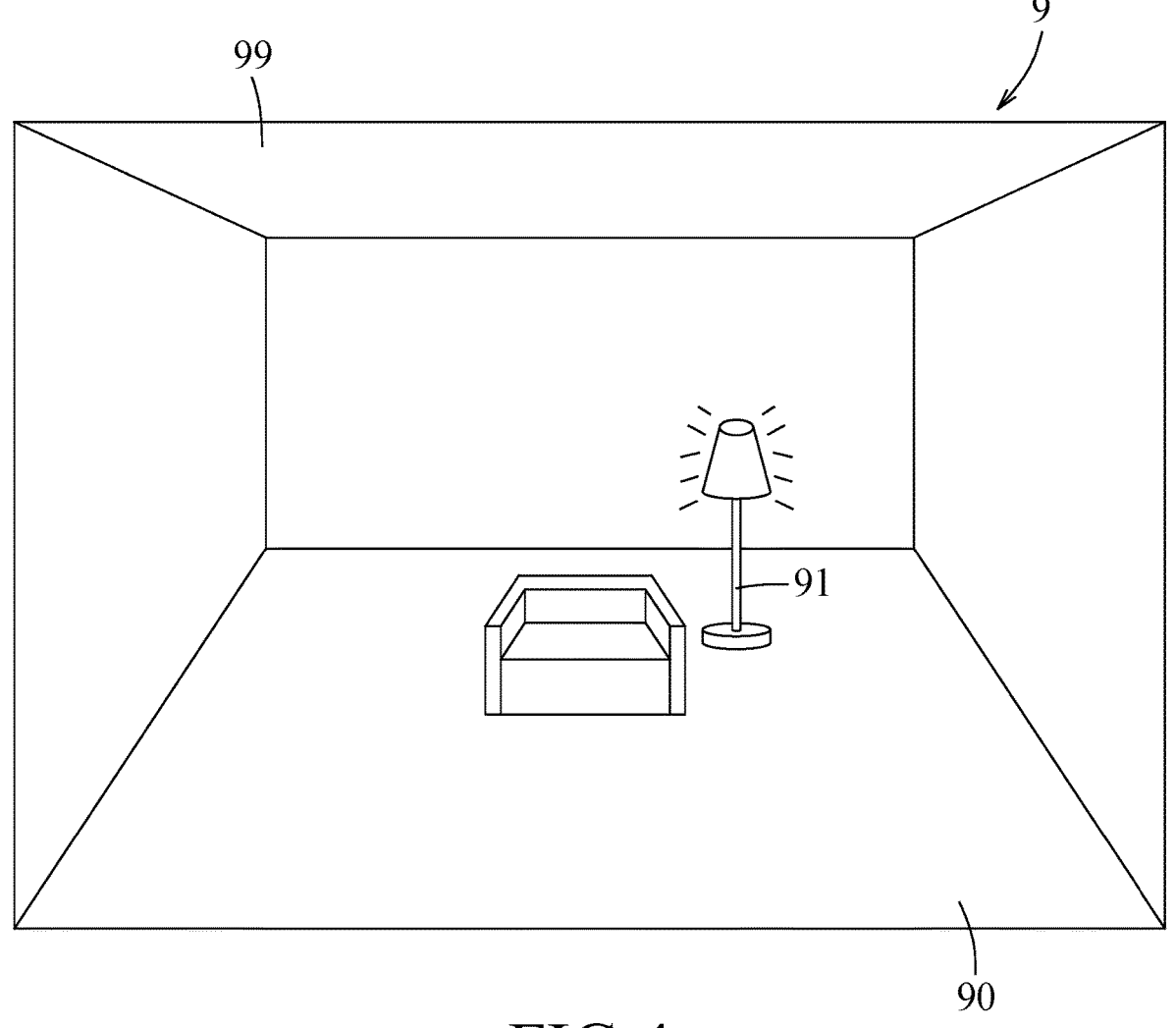
FIG. 4 is a schematic diagram illustrating an image of the room captured by a camera unit of the television according to some embodiments.

In step S11, the camera unit 13 captures the room image that contains the indoor environment of the room 9, and transmits the room image to the processing unit 14. FIG. 4 shows an example of a room image that corresponds to the indoor environment of the room 9 as depicted in FIG. 1 and that contains the lamp 91. The room image is usually a color image.

In step S12, the processing unit 14 finds a visually-interfering condition in the room 9 based on the room image. The visually-interfering condition is related to a visual interference that would interfere with television-watching. In the illustrative embodiment, the visually-interfering condition is that a visually-interfering object (i.e., the lamp 91) that would cause light interference is present in the room 9.

Figure 5:
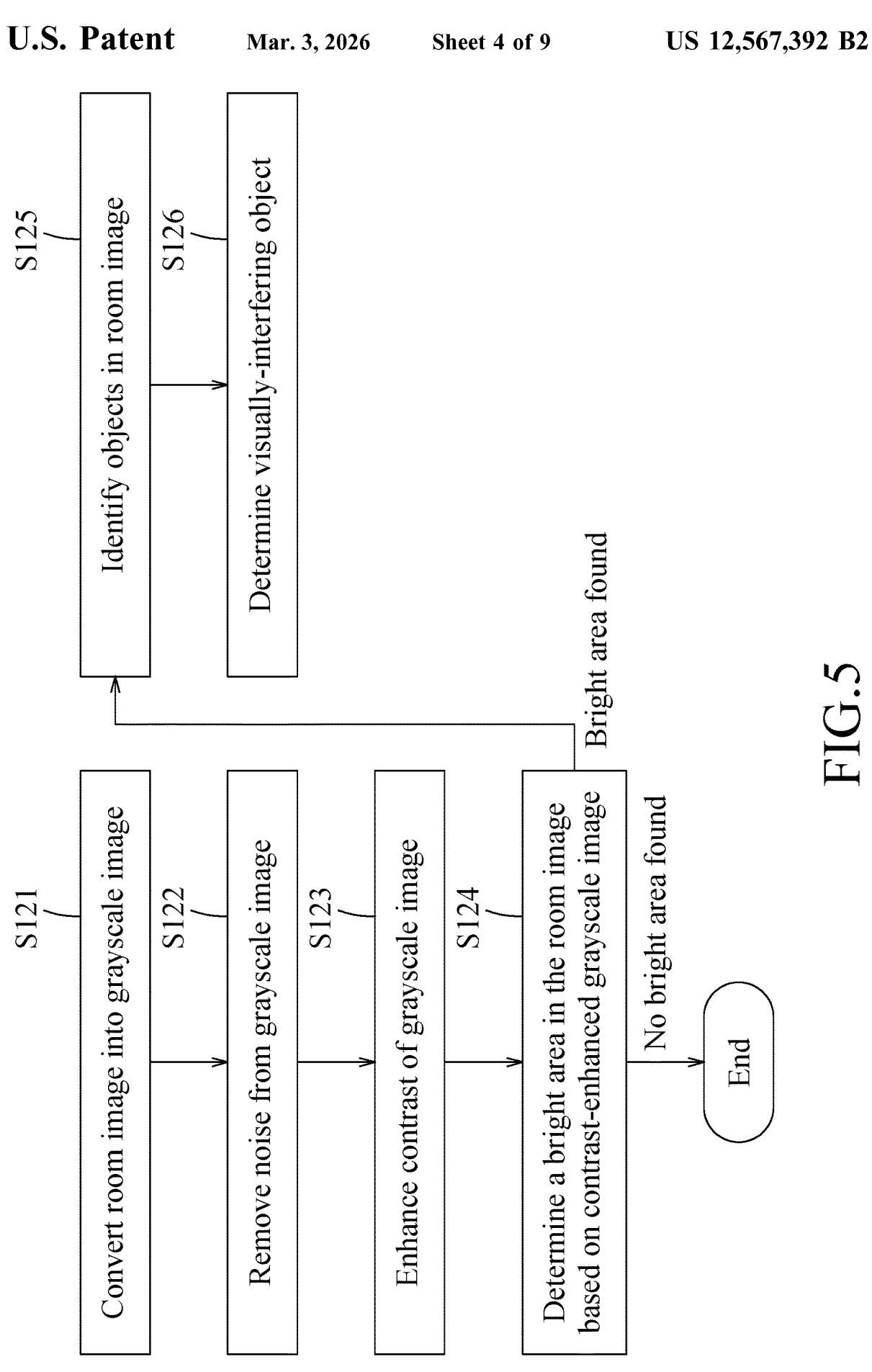
FIG. 5 is a flow chart illustrating some sub-steps of step S12 of the method according to some embodiments.

FIG. 5 illustrates a flow path of step S12.

In sub-step S121, the processing unit 14 converts the room image into a grayscale image. As an example, each pixel in the grayscale image may have a relationship with a corresponding pixel in the room image as:

$$P_{gray} = 0.299 \times P_{red} + 0.587 \times P_{green} + 0.114 \times P_{blue}$$

where $P_{gray}$ represents a pixel value of the pixel in the grayscale image, and $P_{red}$, $P_{green}$ and $P_{blue}$ represent pixel values of red, green and blue components of the corresponding pixel in the room image, respectively. Since $P_{gray}$ also represents a brightness value of the corresponding pixel in the room image, a bright area in the room image (e.g., the lampshade of the lamp 91 in FIG. 4, which is much brighter than other parts of the room image) would also be a bright area in the grayscale image.

In sub-step S122, the processing unit 14 uses a filtering technique to remove noise from the grayscale image. As an example, the processing unit 14 may set a new pixel value for each pixel of the grayscale image, where the new pixel value is a weighted average of neighboring pixels of the pixel. As an example, a Gaussian blur may be the filtering technique used in this sub-step in order to remove high-frequency noise from the grayscale image. In some embodiments, sub-step S122 may be omitted.

Figure 6:
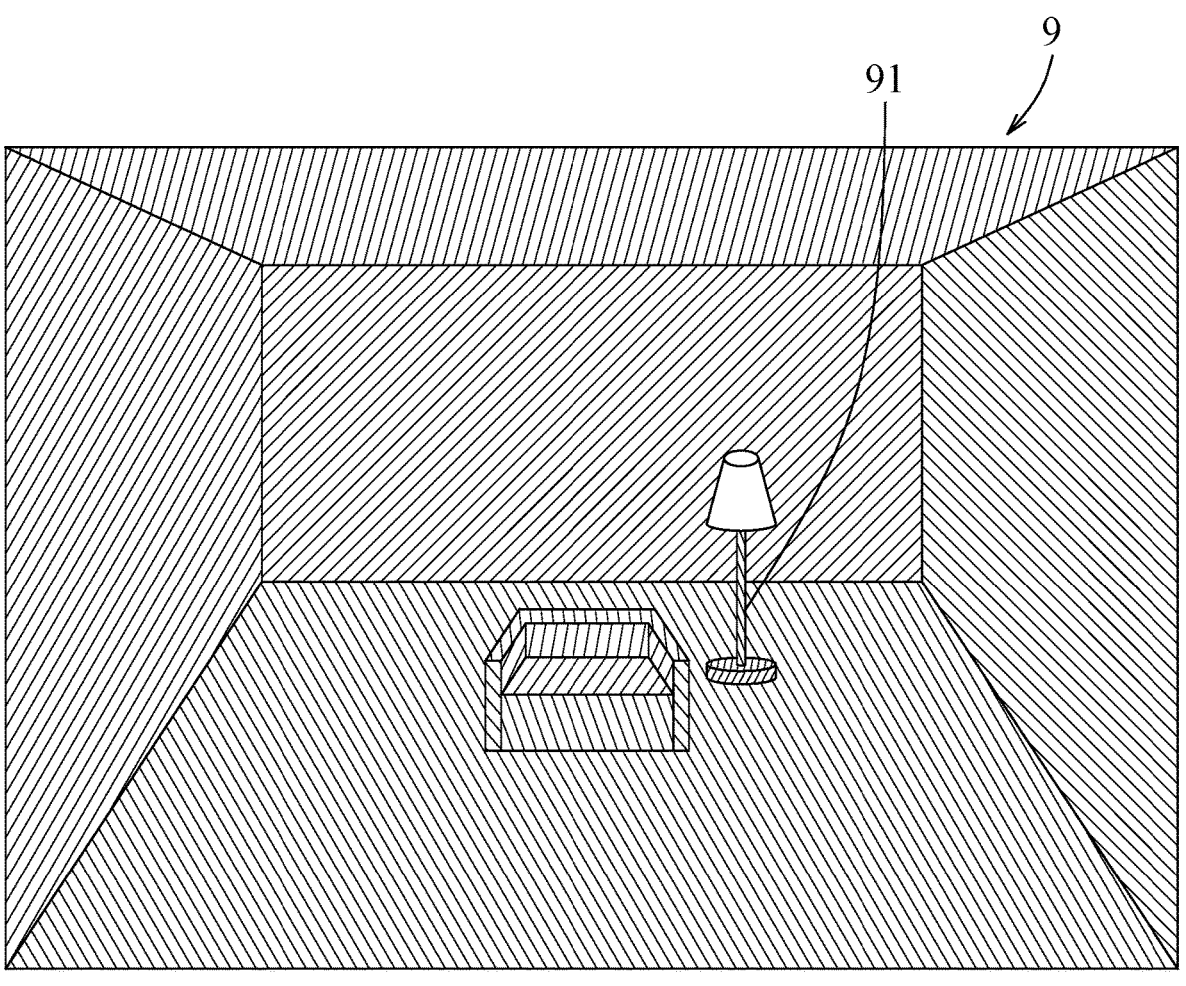
FIG. 6 is a schematic diagram illustrating a grayscale image converted from the image of the room according to some embodiments.

In sub-step S123, the processing unit 14 enhances a contrast of the grayscale image to amplify a brightness difference in the grayscale image, so as to obtain a contrast-enhanced grayscale image. FIG. 6 illustrates an example of the contrast-enhanced grayscale image where the bright area in the grayscale image would be shown as a bright spot (nearly white, may be whiter than it originally was in the grayscale image), and the other areas in the grayscale image would become darker (nearly black) than they originally were in the grayscale image. As a result, the bright spot, which is composed of a cluster of pixels with large pixels values, would be surrounded by the dark areas.

In sub-step S124, the processing unit 14 determines a bright area in the room image based on the contrast-enhanced grayscale image. For example, the processing unit 14 may compare the pixels values of the pixels of the contrast-enhanced grayscale image with a grayscale threshold to determine whether the contrast-enhanced grayscale image includes a bright spot (i.e., a cluster of pixels of which the pixels values are greater than the grayscale threshold, and which are surrounded by multiple pixels whose pixels values are smaller than the grayscale threshold (e.g., the pixels of the dark areas). It is noted that the grayscale threshold may be either a single grayscale value or a range of grayscale values (in which case, the pixel values of the pixels in the bright spot>an upper limit of the range, and the pixels values of the surrounding dark pixels<a lower limit of the range), and this disclosure is not limited in this respect. When the processing unit 14 finds a bright spot in the contrast-enhanced grayscale image, the processing unit 14 determines an area in the room image that corresponds in position to the bright spot in the contrast-enhanced grayscale image to be the bright area in the room image. When no bright area is found in the room image (i.e., no bright spot is found in the contrast-enhanced grayscale image), the flow path ends When at least one bright area is found in the room image (i.e., at least one bright spot is found in the contrast-enhanced grayscale image), the flow path goes to sub-step S125, where the processing unit 14 identifies objects that are present in the room image. For example, the processing unit 14 may use a conventional object detection technique to identify objects such as sofas, chairs, tables, desks, cabinets, lamps, curtains, windows, doors, and other things in the room image. There are various conventional object detection techniques that should be known to one having ordinary skills in the art, so details thereof are omitted herein for the sake of brevity.

In sub-step S126, the processing unit 14 determines one of the objects thus identified in the room image, which corresponds in position to the bright area thus determined in the room image, to be the visually-interfering object. In other words, the visually-interfering object would correspond in position to the bright spot in the contrast-enhanced grayscale image. In the illustrative embodiment, since the lampshade of the lamp 91 corresponds to the bright area in the room image, the processing unit 14 determines the lamp 91, as a whole, to be the visually-interfering object that causes light interference (i.e., the visually-interfering condition in the illustrative embodiment).

Figure 7:
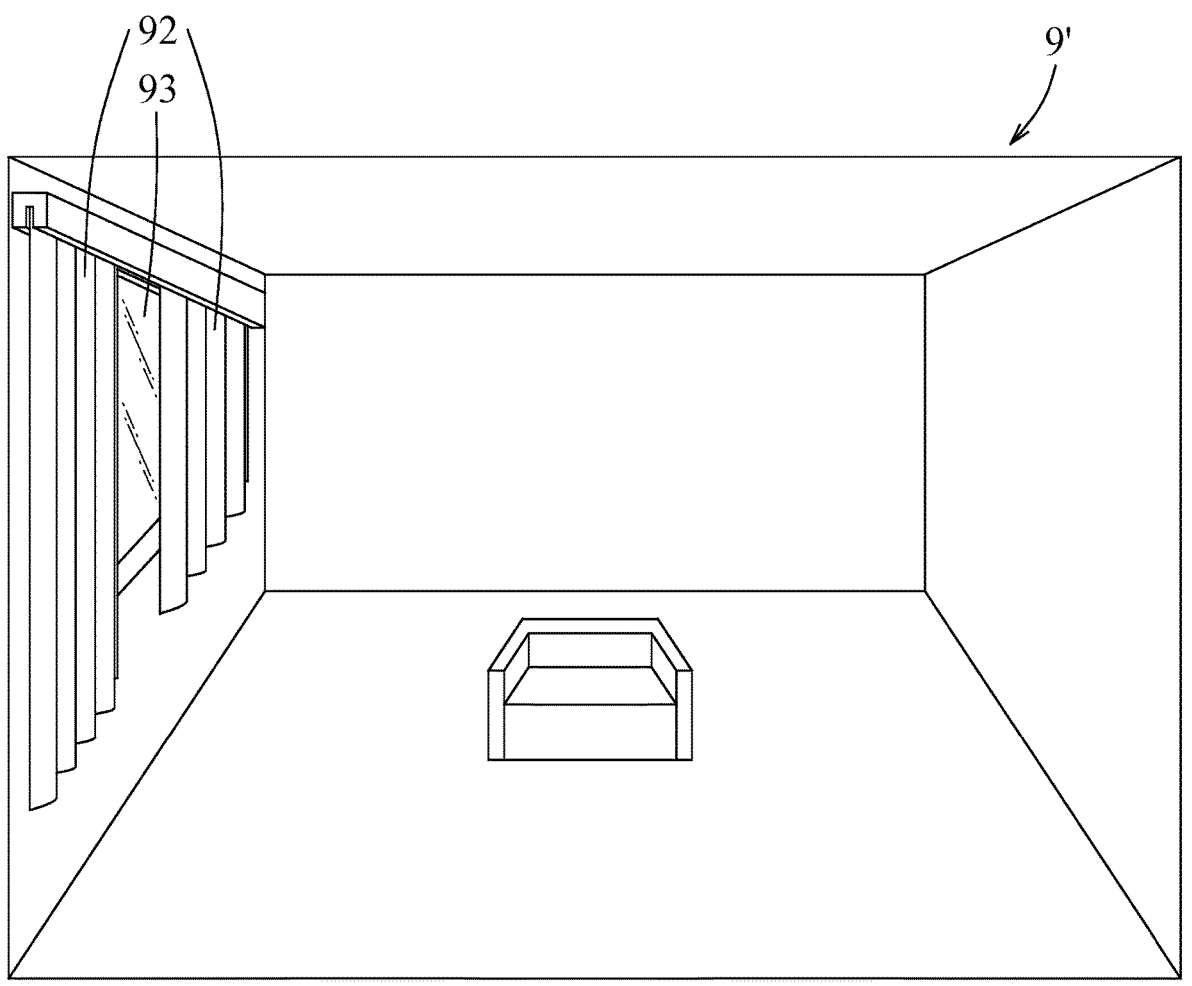
FIG. 7 is a schematic diagram illustrating an image of another room captured by a camera unit of the television according to some embodiments.

In another example, as illustrated in FIG. 7 that exemplifies another room image, the bright area results from an open curtain 92 that allows light to enter a room 9' through a window 93. Following the above sub-steps S121-S126, the curtain 92 would be identified as the visually-interfering object in this example.

Figure 8:
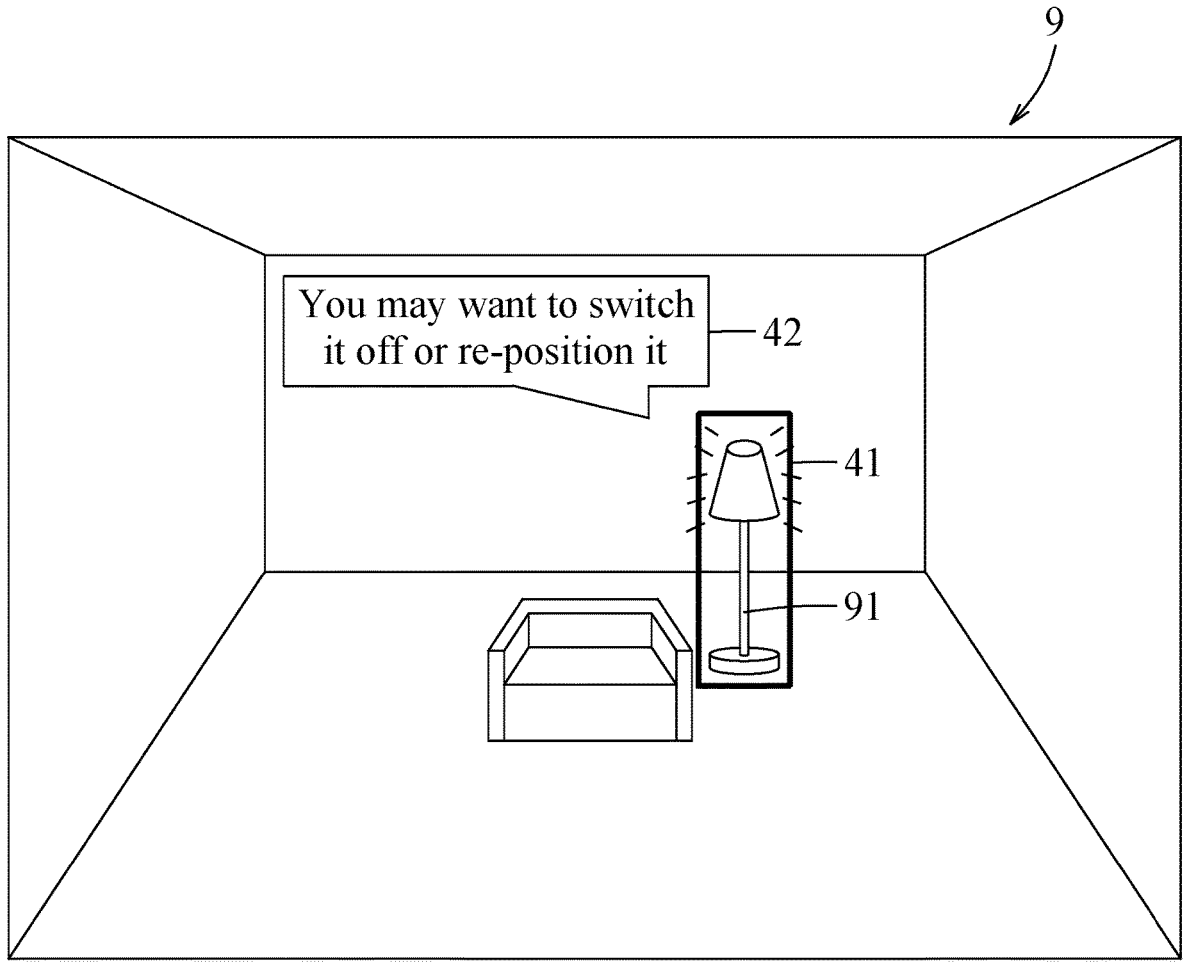
FIG. 8 is a schematic diagram illustrating an overlay that is imposed onto the image of the room to visually signify a visually-interfering condition according to some embodiments.

Referring to FIGS. 1 to 3 again, in step S13, the processing unit 14 generates an overlay based on the visually-interfering condition found in step S12, and causes the display unit 11 to display the room image, with the overlay covering the room image, wherein the overlay visually signifies the visually-interfering condition. Referring to FIG. 8, the overlay is generated to include a frame 41 and a message box 42, where the frame 41 encircles the visually-interfering object (e.g., the lamp 91 in FIG. 8) to highlight the visually-interfering object, and the message box 42 shows an object-related recommendation about how to alleviate or eliminate the effects of the visually-interfering object. Since the visually-interfering object is the lamp 91 in this example, the object-related recommendation is related to switching off the lamp 91 or re-positioning the lamp 91. In another example where the visually-interfering object is an open curtain 92 as illustrated in FIG. 7, the overlay may be generated to include a frame that encircles the curtain 92, and a message box that shows an object-related recommendation related to closing the curtain 92. In some variations of the embodiment, the message box 42 may be omitted, and the overlay includes only the frame 41 to highlight the visually-interfering object. In some variations of the embodiment, the overlay may be generated to include a symbol, such as an arrow symbol pointing to the visually-interfering object, to highlight the visually-interfering object, instead of using a frame. In some variations of the embodiment, the overlay may be generated to include only text beside the visually-interfering object to show the object-related recommendation and to highlight the visually-interfering object. In some embodiments, the overlay may highlight a part of the visually-interfering object that corresponds in position to the bright area (e.g., the lampshade) rather than the entire visually-interfering object (e.g., the lamp 91). This disclosure is not limited to specific ways of highlighting the visually-interfering object.

Figure 9:
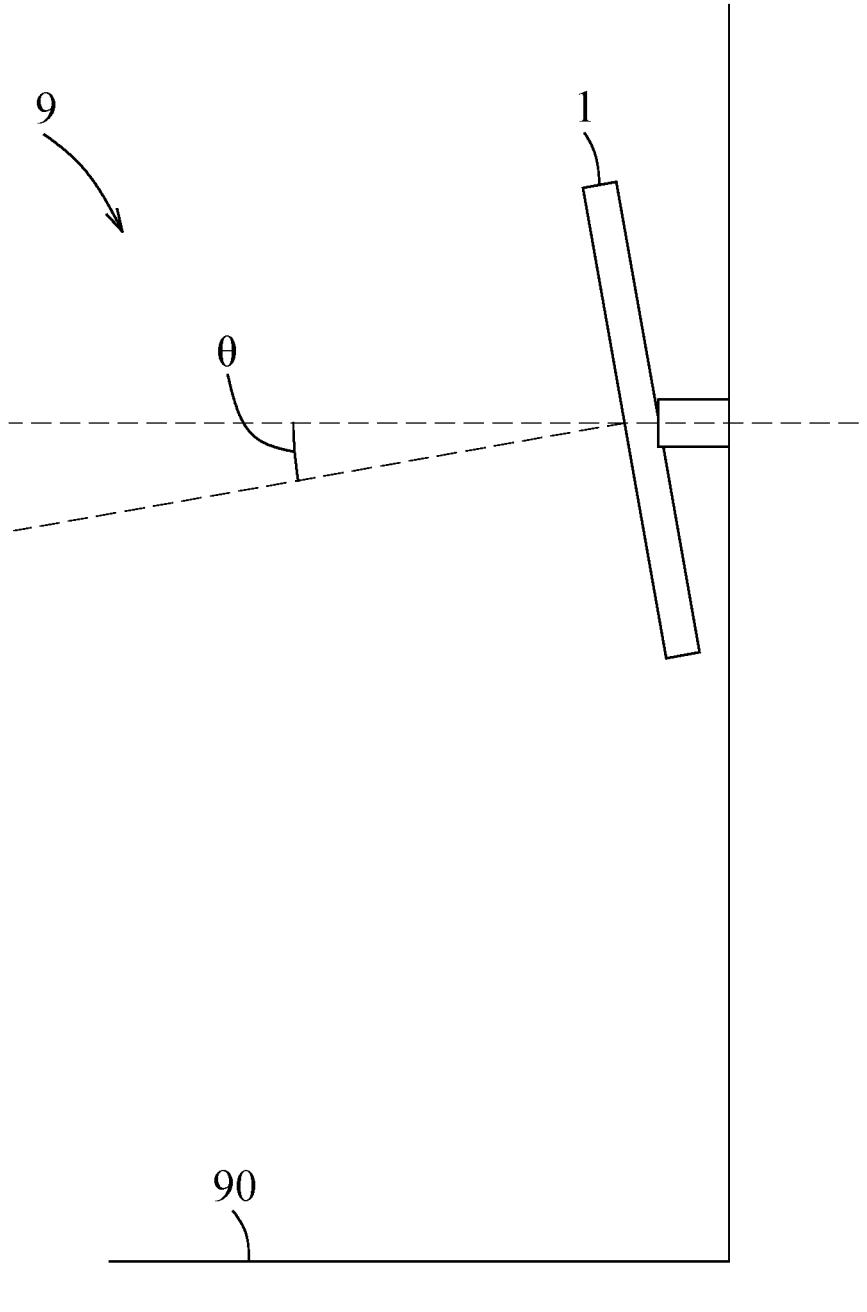
FIG. 9 is a schematic diagram illustrating a tilt angle of the television according to some embodiments.
Figure 10:
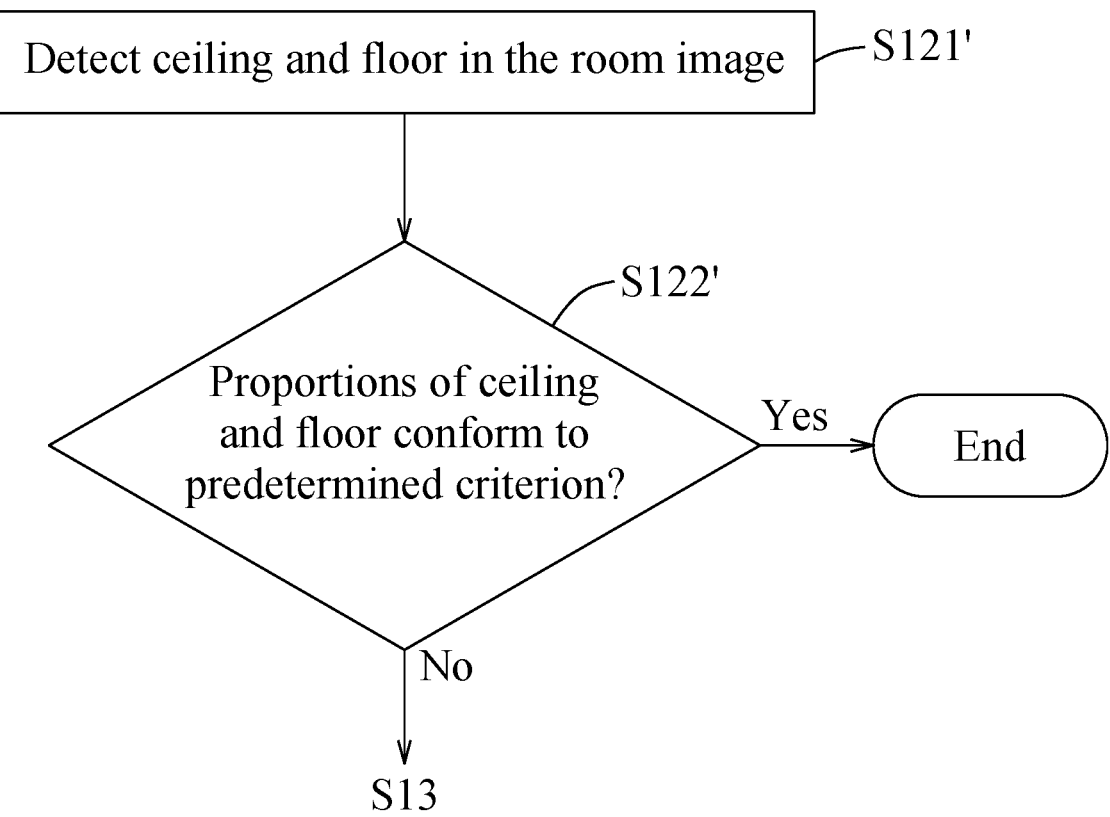
FIG. 10 is a flow chart illustrating some sub-steps of step S12 of the method according to some embodiments.

Referring to FIG. 9, another type of visually-interfering condition in the room 9 that can be found in step S12 could be that a tilt angle θ of the television 1 with respect to a floor 90 of the room 9 (e.g., an angle between a normal line of the screen of the television 1 and a horizontal line parallel to the floor 90) does not fall within a recommended range. When the tilt angle θ does not fall within the recommended range, meaning that the television 1 faces too upward or downward, the viewer may feel uncomfortable and be unable to perceive good visual presentation when watching television. In order to identify such a visually-interfering condition, step S12 may include a flow path as depicted in FIG. 10, which will be described hereinafter in cooperation with FIGS. 2 and 4.

In sub-step S121', the processing unit 14 detects a ceiling 99 and a floor 90 of the room 9 in the room image. In some embodiments, the processing unit 14 detects lines and edges in the room image using a conventional method, such as the Hough line transform. By virtue of detecting the lines and edges in the room image, joints between the ceiling and the walls, between the walls and the floor, and between different walls can be identified, so the processing unit 14 can determine the ceiling 99 and the floor 90 in the room image based on the lines and the edges thus detected.

In sub-step S122', the processing unit 14 determines whether proportions of the ceiling 99 and the floor 90 thus detected in the room image conform to a predetermined criterion. In some embodiments, the predetermined criterion may be a range of a proportion of an area of the ceiling 99 to an area of the floor 90 in the room image, but this disclosure is not limited in this respect. Further referring to FIG. 9, when the proportions of the ceiling 99 and the floor 99 do not conform to the predetermined criterion, the processing unit 14 determines that the tilt angle θ of the television 1 with respect to a floor 90 of the room 9 does not fall within the recommended range, and the flow goes to step 13. Otherwise, the flow path ends. In some embodiments, the processing unit 14 may determine whether the tilt angle θ of the television 1 with respect to the floor 90 of the room 9 falls within a recommended angular range in different approaches, and this disclosure is not limited in this respect.

In such a scenario, the overlay generated in step S13 may show a television-related recommendation that is related to adjusting the tilt angle of the television with respect to the floor of the room, in a form of text, symbols (e.g., an arrow symbol that signifies a recommended adjusting direction (upward or downward)), or a combination thereof.

It is noted that the flow paths as illustrated in FIGS. 5 and 10 may co-exist in step S12 in some embodiments. In other words, step 12 may include the two flow paths that are performed either concurrently or sequentially. In such embodiments, when detecting a bright area that corresponds to a lamp in the room image (sub-step S124) and that is located at a ceiling of the room (identified in sub-step S121'), the processing unit 14 may determine the lamp to be not only a visually-interfering object but also a ceiling light. In such a case, the overlay generated in step S13 may show an object-related recommendation that is related to switching off the ceiling light or adjusting a tilt angle of the television relative to a floor of the room (e.g., making the television face more downward to avoid light emitted from the ceiling light from being reflected toward the viewer).

In summary, the embodiments of this disclosure provide a method adapted for a television that has a camera unit mounted thereto to find out a visually-interfering condition in the room, such as a lighting lamp, an open curtain, an inappropriate tilt angle of the television, etc., and then display the room image with an overlay that visually signifies the visually-interfering condition. The overlay thus imposed over the room image may highlight a visually-interfering object, and thus can assist the viewer in quickly locating the origin(s) that causes the visually-interfering condition. The overlay may further show a recommendation (e.g., an object-related recommendation and/or a television-related recommendation) to assist the viewer in resolving the visually-interfering condition in an efficient way, thereby improving the watching experience.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method adapted for a television to assist a viewer in improving watching experience in a room in which the television is placed, comprising steps of:
   by a camera unit that is mounted to the television, capturing a room image that contains an indoor environment of the room;
   by a processing unit of the television, finding a visually-interfering condition in the room based on the room image, wherein the visually-interfering condition is related to a visual interference that would interfere with television-watching; and
   by the processing unit, causing a display unit of the television to display the room image, with an overlay covering the room image, wherein the overlay visually signifies the visually-interfering condition,
   wherein the visually-interfering condition includes that a visually-interfering object that would cause light interference is present in the room, and
   wherein:
      when the visually-interfering object is identified as a lamp, the overlay shows a first object-related recommendation that is related to switching off the lamp or re-positioning the lamp;
      when the visually-interfering object is identified as a ceiling light, the overlay shows a second object-related recommendation that is related to switching off the ceiling light or adjusting a tilt angle of the television relative to a floor of the room; and
   when the visually-interfering object is identified as a curtain that is open, the overlay shows a third object-related recommendation that is related to closing the curtain.

2. The method as claimed in claim 1, wherein the overlay highlights the visually-interfering object.

3. The method as claimed in claim 1, wherein the step of finding a visually-interfering condition in the room includes:
   determining a bright area in the room image;
   identifying objects that are present in the room image; and
   determining one of the objects thus identified in the room image, which corresponds in position to the bright area thus determined in the room image, to be the visually-interfering object.

4. The method as claimed in claim 3, wherein the bright area in the room image is determined by:
   converting the room image into a grayscale image; and
   enhancing a contrast of the grayscale image to amplify a brightness difference in the grayscale image, so as to obtain a contrast-enhanced grayscale image; and
   wherein the bright area in the room image corresponds in position to, in the contrast-enhanced grayscale image, a cluster of pixels of which pixel values are greater than a grayscale threshold, and which are surrounded by multiple pixels whose pixel values are smaller than the grayscale threshold.

5. The method as claimed in claim 4, wherein, before enhancing the contrast of the grayscale image, the processing unit uses a filtering technique to remove noise from the grayscale image.

6. A method adapted for a television to assist a viewer in improving watching experience in a room in which the television is placed, comprising steps of:
   by a camera unit that is mounted to the television, capturing a room image that contains an indoor environment of the room;
   by a processing unit of the television, finding a visually-interfering condition in the room based on the room image, wherein the visually-interfering condition is related to a visual interference that would interfere with television-watching; and
   by the processing unit, causing a display unit of the television to display the room image, with an overlay covering the room image, wherein the overlay visually signifies the visually-interfering condition,
   wherein the visually-interfering condition includes that a tilt angle of the television with respect to a floor of the room does not fall within a recommended range.

7. The method as claimed in claim 6, wherein the step of finding a visually-interfering condition in the room includes:
   detecting a ceiling and a floor of the room in the room image;
   determining whether proportions of the ceiling and the floor thus detected conform to a predetermined criterion; and
   determining that the tilt angle of the television with respect to the floor of the room does not fall within the recommended range when the proportions of the ceiling and the floor thus detected do not conform to the predetermined criterion.

8. The method as claimed in claim 7, wherein the ceiling and the floor of the room are detected by:
   detecting lines and edges in the room image; and
   determining the ceiling and the floor in the room image based on the lines and the edges thus detected.

9. The method as claimed in claim 6, wherein the overlay shows a television-related recommendation that is related to adjusting the tilt angle of the television with respect to the floor of the room.

10. A television adapted to assist a viewer in improving watching experience in a room in which the television is placed, comprising:
   a housing;
   a camera unit mounted to said housing;
   a processing unit coupled to said camera unit; and
   a display unit coupled to said processing unit;
   wherein said camera unit, said processing unit and said display unit are configured to cooperatively perform the method as claimed in claim 1.

11. A television adapted to assist a viewer in improving watching experience in a room in which the television is placed, comprising:
   a housing;
   a camera unit mounted to said housing;
   a processing unit coupled to said camera unit; and
   a display unit coupled to said processing unit;
   wherein said camera unit, said processing unit and said display unit are configured to cooperatively perform the method as claimed in claim 2.

12. A television adapted to assist a viewer in improving watching experience in a room in which the television is placed, comprising:

a housing;

a camera unit mounted to said housing;

a processing unit coupled to said camera unit; and a display unit coupled to said processing unit;

wherein said camera unit, said processing unit and said display unit are configured to cooperatively perform the method as claimed in claim 3.

13. A television adapted to assist a viewer in improving watching experience in a room in which the television is placed, comprising:

a housing;

a camera unit mounted to said housing;

a processing unit coupled to said camera unit; and a display unit coupled to said processing unit;

wherein said camera unit, said processing unit and said display unit are configured to cooperatively perform the method as claimed in claim 4.

14. A television adapted to assist a viewer in improving watching experience in a room in which the television is placed, comprising:

a housing;

a camera unit mounted to said housing;

a processing unit coupled to said camera unit; and a display unit coupled to said processing unit;

wherein said camera unit, said processing unit and said display unit are configured to cooperatively perform the method as claimed in claim 5.

15. A television adapted to assist a viewer in improving watching experience in a room in which the television is placed, comprising:

a housing;

a camera unit mounted to said housing;

a processing unit coupled to said camera unit; and a display unit coupled to said processing unit;

wherein said camera unit, said processing unit and said display unit are configured to cooperatively perform the method as claimed in claim 6.

16. A television adapted to assist a viewer in improving watching experience in a room in which the television is placed, comprising:

a housing;

a camera unit mounted to said housing;

a processing unit coupled to said camera unit; and a display unit coupled to said processing unit;

wherein said camera unit, said processing unit and said display unit are configured to cooperatively perform the method as claimed in claim 7.

17. A television adapted to assist a viewer in improving watching experience in a room in which the television is placed, comprising:

a housing;

a camera unit mounted to said housing;

a processing unit coupled to said camera unit; and a display unit coupled to said processing unit;

wherein said camera unit, said processing unit and said display unit are configured to cooperatively perform the method as claimed in claim 8.

18. A television adapted to assist a viewer in improving watching experience in a room in which the television is placed, comprising:

a housing;

a camera unit mounted to said housing;

a processing unit coupled to said camera unit; and a display unit coupled to said processing unit;

wherein said camera unit, said processing unit and said display unit are configured to cooperatively perform the method as claimed in claim 9.

19. The method as claimed in claim 2, wherein the step of finding a visually-interfering condition in the room includes:

determining a bright area in the room image;

identifying objects that are present in the room image; and determining one of the objects thus identified in the room image, which corresponds in position to the bright area thus determined in the room image, to be the visually-interfering object.

20. The method as claimed in claim 7, wherein the overlay shows a television-related recommendation that is related to adjusting the tilt angle of the television with respect to the floor of the room.

* * * * *